United States Patent [19]

Echte et al.

[11] 4,330,641

[45] May 18, 1982

[54] IMPACT-RESISTANT THERMOPLASTIC MOLDING MATERIALS WITH IMPROVED STRESS-CRACKING RESISTANCE

[75] Inventors: Adolf Echte, Ludwigshafen; Hermann Gausepohl, Mutterstadt; Helmut Jenne, Schriesheim; Hans Mittnacht, Weinheim, all of Fed. Rep. of Germany

[73] Assignee: BASF Aktiengesellschaft, Fed. Rep. of Germany

[21] Appl. No.: 204,527

[22] Filed: Nov. 6, 1980

[30] Foreign Application Priority Data

Nov. 20, 1979 [DE] Fed. Rep. of Germany ....... 2946761
Dec. 19, 1979 [DE] Fed. Rep. of Germany ....... 2951117

[51] Int. Cl.$^3$ .................. C08F 279/02; C08F 279/04; C08F 279/06
[52] U.S. Cl. .................................. 525/310; 525/295; 525/296; 525/316
[58] Field of Search ............ 260/4 AR; 525/310, 296, 525/295, 316

[56] References Cited

U.S. PATENT DOCUMENTS

| | | | |
|---|---|---|---|
| 4,078,018 | 3/1978 | Chauvel et al. | 525/310 |
| 4,080,406 | 3/1978 | Kelsey | 525/310 |
| 4,100,228 | 7/1978 | Dennis et al. | 525/310 |
| 4,144,204 | 3/1979 | Mittnacht et al. | 260/4 AR |

*Primary Examiner*—William F. Hamrock
*Attorney, Agent, or Firm*—Keil & Witherspoon

[57] ABSTRACT

Thermoplastic molding materials which contain a copolymer which has been made impact-resistant with a rubber. The copolymer is produced by polymerizing a mixture of a monovinyl-aromatic compound and an acrylic acid derivative or methacrylic acid derivative in the presence of a rubber. The folding materials contain a specific proportion of soft component. The diameter of the particles of the soft component, and the swelling index of the soft component, lie within a specific range, and the tensile strength of the molding material is higher than the yield strength.

3 Claims, No Drawings

IMPACT-RESISTANT THERMOPLASTIC MOLDING MATERIALS WITH IMPROVED STRESS-CRACKING RESISTANCE

The invention relates to thermoplastic molding materials, possessing improved stress-cracking resistance and consisting of polymers of monovinyl-aromatic compounds, which polymers have been made impact-resistant with rubber.

It is known that articles made from styrene polymers which have been made impact-resistant are prone to suffer stress cracking as soon as they come into contact with agents which trigger this phenomenon. Many organic media do so; those which are particularly well known to cause stress cracking are, on the one hand, fats and oils, and, on the other hand, organic blowing agents, for example fluorohydrocarbons and chlorohydrocarbons. This is a disadvantage in, for example, the manufacture of refrigerator components from impact-resistant polystyrene. Thus, refrigerator liners can crack, when back-filled with polyurethane foam, as a result of the halohydrocarbon blowing agent used in the foam.

U.S. Pat. No. 4,144,204 discloses thermoplastic molding materials which are produced by polymerization of vinyl-aromatics in the presence of a rubber, and in which the proportion of the soft component is at least 28% by weight, the particles of the soft component phase have a diameter of not less than 4 $\mu$m, the swelling index of the soft component is 9.5 and the tensile strength of the molding material, measured according to DIN No. 53,455, is not less than 5% above the corresponding yield strength. Such materials are highly resistant to stress cracking. It is desirable to improve at least some of the other properties of the materials.

It is an object of the present invention to discover and produce styrene polymers, which have been made impact-resistant with rubber and which possess improved stress-cracking resistance and other improved properties.

We have found that this object is achieved by providing thermoplastic molding materials which contain a polymer of a monovinyl-aromatic compound which is formed by polymerizing the said compound in the presence of a rubber and which has hence been made impact-resistant with rubber, the proportion of soft component in the impact-resistant polymer being not less than 28% by weight (and being defined as the toluene-insoluble content minus any pigments), and the tensile strength of the molding material, measured by a tensile test on a molded dumbell-shaped bar, according to DIN No. 53,455, being not less than 5% above the corresponding yield strength.

In the above materials, the polymer is formed by copolymerizing a monovinyl-aromatic compound with from 2 to 12% by weight of an acrylic acid derivative or methacrylic acid derivative in the presence of a rubber, and the particles of the disperse soft component phase in the impact-resistant polymer have a weight-average mean diameter of not less than 3.5 $\mu$m, the swelling index of the soft component in toluene being greater than 8.0.

The impact-resistant polymer can be prepared according to any conventional process, provided that it results in the above properties. The most commonly used processes are mass polymerization or solution polymerization, based on U.S. Pat. No. 2,694,692 and similar processes, or mass/suspension polymerization, as described, for example, in U.S. Pat. No. 2,862,906. However, other methods of preparation may also be used, provided they allow the above properties to be achieved.

Suitable monovinyl-aromatic compounds are in particular styrene, as well as nuclear-alkylated or side-chain-alkylated styrenes, e.g. $\alpha$-methylstyrene and vinyltoluene, or mixtures of these. However, styrene is preferred. The comonomers used are derivatives of acrylic acid or methacrylic acid, in amounts of from 2 to 12% by weight, based on the mixture of monovinyl-aromatic compound and comonomers.

Examples of suitable acrylic acid and/or methacrylic acid derivatives (these being polar compounds) are the esters of the acids with monoalcohols of 1 to 8 carbon atoms. Monoesters of dialcohols may also be used, as may nitrogen-containing derivatives, e.g. amides or nitriles, and the acids themselves. The methacrylic acid esters of alcohols of 1 to 4 carbon atoms, in particular methyl methacrylate, are especially suitable. The comonomers may be employed alone or as a mixture with one or more monovinyl-aromatic compounds.

The rubbers used are the conventional natural or synthetic rubbers usually employed for making styrene polymers impact-resistant. Suitable rubbers, for the purposes of the invention, are natural rubber and, for example, polybutadiene, polyisoprene and copolymers of butadiene and/or isoprene with styrene and other comonomers, which copolymers have a glass transition temperature of below $-20°$ C. These rubbery copolymers of butadiene and/or isoprene may be random or block copolymers. Other suitable rubber components for the impact-resistant polymers according to the invention are elastomeric ethylene-propylene copolymers, ethylene-propylene-diene-ter- polymers, silicone rubbers containing unsaturated groups, and others. Polybutadienes, containing, for example, from 30 to 99% of cis-1,4 units, are particularly preferred.

The impact-resistant polymers having the properties required by the invention are prepared by copolymerizing the monomer mixture in the presence of the rubber. As mentioned, the polymerization is as a rule carried out in a conventional manner as a mass polymerization, solution polymerization or aqueous dispersion polymerization, the rubber first being dissolved in the polymerizable monomers and this starting solution then being polymerized.

In solution polymerization, a maximum of 50% by weight, based on the monomers employed, of an inert diluent can be added to the above starting solution. Examples of suitable inert diluents are aromatic hydrocarbons or mixtures of aromatic hydrocarbons. Amongst these, toluene, ethylbenzene, the xylenes and mixtures of these compounds are preferred.

In aqueous dispersion polymerization, solvents are not usually added; an particularly advantageous embodiment is to prepolymerize the solution of the rubber in the monomers up to a conversion of about 30% by mass polymerization under the action of shearing forces, then to suspend this reaction mass in water, and thereafter to complete the polymerization. In general, this process is initiated by adding oil-soluble free radical initiators, eg. benzoyl peroxide, dicumyl peroxide, di-tert.-butyl peroxide, azo-diiso-butyronitrile or the like, or combinations thereof, but the prepolymerization can also be initiated thermally. Suitable suspending agents are, as is known, water-soluble substances such as methylcellulose, hydroxy-propylcellulose, polyvinyl alcohol, partially hydrolyzed polyvinyl acetates and the like, or inorganic dispersions, for example barium sulfate dispersions. The suspending agents are generally employed in an amount of from 0.1 to 5% by weight, based on the organic phase.

The mass polymerization or solution polymerization is as a rule carried out at from 50° to 250° C., preferably from 100° to 200° C. The polymerization batch must be well stirred at least during the first stage of the polymerization, that is to say up to conversions, of the mixtures of monovinyl-aromatic compounds and comonomers, of up to 35% by weight. All these polymerization processes are well known and are described in detail in the literature. A summary is to be found in Amos, Polym, Engng. Sci. 14 (1974), No. 1, 1–11, and in U.S. Pat. No. 2,694,692 and 2,862,906 to which reference may be made for further details.

For the purposes of the invention, the soft component is the proportion of the impact-resistant polymer which is insoluble in toluene at room temperature (25° C.), minus any pigments. The soft component accordingly corresponds to the gel content of the product.

The soft component is in general of heterogeneous structure; it is as a rule formed during the process of preparation and its amount and state of division are influenced by the process conditions. As is known, the solution, to be polymerized, of the rubber in the monovinyl-aromatic monomer separates, immediately after the start of the reaction, into 2 phases, of which one, a solution of the rubber in the monomers, initially forms the continuous phase, whilst the second, a solution of the copolymer in its own monomers remains suspended as droplets in the continuous phase. With increasing conversion, the amount of the second phase increases at the expense of the first phase, with the monomers being consumed. In the course thereof, phase inversion occurs, resulting in droplets of rubber solution dispersed in copolymer solution; these droplets however, for their part, retain enclosed smaller droplets of what is now the continuous phase.

Alongside this process, a grafting reaction takes place, in which the chemical bonds between the rubber molecule and the copolymer are formed, resulting in a graft copolymer of the two constituents. This process is known and is described in detail by, for example, Fischer, Die Angew. Makrom. Chem. 33 (1979), 35–74. Both the grafted and the mechanically enclosed proportion of the copolymer in the rubber particles form part of the soft component.

When the material has been polymerized completely, what has resulted is a heterogeneous soft component embedded in a hard matrix of copolymer, the soft component consisting of grafted rubber particles with inclusions of matrix material (copolymer). The greater the amount of included matrix material, the greater the amount of soft component for a given rubber content. This amount of soft component accordingly depends not only on the amount of rubber employed but also on how the process is conducted, especially before and during the phase inversion. The detailed measures are specific to the process and are known to those skilled in the art (see, for example, Freeguard, Brit. Polym. J. 6 (1974) 205–228; Wagner and Robeson, Rubber Chem. Techn. 43 (1970) 1,129 et seq.).

In order to arrive at impact-resistant thermoplastic molding materials having the properties required according to the invention, the amount of rubber which is dissolved, prior to the polymerization, in the monomers in order to prepare the starting solution is chosen, in accordance with the final conversion during polymerization, so that the resulting impact-resistant polymer contains not less than 28% by weight, preferably 30% by weight or more, based on the impact-resistant polymer, of the soft component. The upper limit of the soft component content is about 50–60% by weight, because of the requirement that the copolymer must form the continuous phase. For the thermoplastic molding materials according to the invention, a soft component content of from 30 to 40% by weight, based on impact-resistant polymer, has proved particularly advantageous. The rubber content of the impact-resistant polymer is in that case generally from 2 to 15% by weight, preferably from 5 to 12% by weight.

As has been explained and is well known, the copolymers which are obtained from the mixtures of monovinyl-aromatic compounds and derivatives of acrylic acid or methacrylic acid and have been made impact-resistant consist of a homogeneous continuous phase (matrix) of the copolymer, in which the rubber particles of the soft component are embedded as the disperse phase, the rubber particles having been partially cross-linked and been grafted with the comonomers, to a greater or lesser degree, during the polymerization.

The particle size of these rubber particles in the dispersed soft component must, according to the invention, lie above the optimum for highly impact-resistant products if the polymers which have been made impact-resistant are to have good stress cracking resistance.

However, in the impact-resistant products having good stress-cracking resistance, according to the present invention, the weight-average mean diameter of the particles of the disperse rubber phase must be not less than 3.5 $\mu$m and preferably not less than 4 $\mu$m. The most advantageous results are obtained if the mean diameter of the dispersed rubber particles forming the soft component, in the polymers which have been made impact-resistant, is from 5 to 10 $\mu$m. The determination of the mean size of the rubber particles in the dispersed soft component can be carried out by, for example, counting and evaluating electron micrographs of thin layers of the impact-resistant polymers (cf. F. Lenz, Zeitschrift f. Wiss. Mikroskopie 63 (1956), 50–56). The particle size of the disperse soft component phase is controlled, in a conventional manner, during the copolymerization of the monomers by appropriate choice of the speed of stirring in the first stage of the polymerization, that is to say up to a monomer conversion of up to 35%. The particle size of the disperse soft component phase is the greater, the lower is the stirrer speed and hence the lower is the shearing stress. The relation between the stirring speed and the size and distribution of the rubber particles in the impact-resistant polymer obtained is described, for example, by Freeguard, loc. cit., to whose publication reference may be made for further details. The stirrer speed required for achieving the desired particle size of the disperse soft component phase depends, inter alia, on the details of the particular apparatus and is known to those skilled in the art or can be determined by a few simple experiments.

A further essential characteristic of the present invention is that the swelling index of the soft component in toluene, after the polymerization of the monovinyl-aromatic monomer(s), is greater than 8.0 but preferably not greater than 15.

The swelling index is determined at the same time as the determination of the content of soft component. To do so, the polymer is dissolved in toluene at room temperature (25° C.) and the insoluble gel component is centrifuged off at 30,000 g and, after decanting the solution, is isolated, weighted moist, dried and weighed again.

The swelling index is defined as the ratio $$Q = \frac{\text{wet weight of gel}}{\text{dry weight of gel}} .$$

It is to be interpreted as a reciprocal concentration by weight and is a measure of the solvent-binding capability of the gel. It is therefore a measure of the degree of crosslinking of the rubber in the soft component. The greater the swelling index, the lower the density of crosslinking of the rubber phase. The numerical value of the swelling index depends on the solvent; the values recorded in the present description relate to toluene.

The content of soft component is also determined in toluene; it is expressed in terms of the ratio $$G = \frac{\text{dry weight of gel}}{\text{weight of polymer sample}} \ [100\% \text{ by weight}]$$

This content of soft component (also referred to as the gel content) must, according to the invention, be greater than 28%. The upper limit is imposed by the fact that the hard component must constitute a continuous phase and should not exceed 50%. A product with optimum swelling index can be obtained in a conventional manner by taking appropriate process steps which depend on the particular method of preparation. Usually, the swelling index can be selected by suitable choice of temperature when preparing the polymers and/or by addition of crosslinking assistants such as peroxides and the like, and by compounding. Preferably, the swelling index should be from 11 to 13.

Finally, according to the invention the tensile strength of the fininshed product should be not less than 5%, preferably from 10 to 50%, and in particular from 10 to 40%, above the corresponding yield strength. To assess this, the tensile strength and the yield strength of the thermoplastic molding materials are measured by the method of DIN No. 53,455 on a molded dumbbell-shaped bar, the difference $\Delta\delta$ of the two measurements is found and this is related to the measured value of the yield strength, as follows:

$$S = \frac{\Delta\delta}{\delta} = \frac{\text{tensile strength} - \text{yield strength}}{\text{yield strength}} \ [100\%]$$

This requirement stipulated in the invention is usually met if the copolymer of the monovinyl-aromatic compound and the acrylic monomer, made impact-resistant with rubber, have, as required by the invention, a content of the soft component of not less than 28% by weight and not more than 50% by weight, and the swelling index of the soft component is greater than 8.0 and less than 15.

However, the ratio of tensile strength to yield strength can be influenced by the conventional additives, especially lubricants and colorants. For example, the ratio in question can be varied, merely by addition of excessive amounts of lubricant, so that the tensile strength is less than the corresponding yield strength. The nature of the lubricant used is also a critical factor. In such a case, the finished product no longer has the desired stress-cracking resistance. Accordingly, it is necessary to ensure, when preparing the novel thermoplastic molding materials, that the conventional additives, especially lubricants and colorants, are appropriately selected, as to type and amount, that the tensile strength of the end product is greater than the corresponding yield strength. From this point of view, conventional non-polar lubricants, such as mineral oil, are more suitable than conventional polar lubricants, such as butyl stearate.

The thermoplastic molding materials of the present invention possess the usual good mechanical and technological properties of impact-resistant styrene polymers, coupled with substantially improved stress-cracking resistance. They are therefor exceptionally useful for, in particular, the manufacture of refrigerator components and foodstuff packaging containers. They are distinguished, in particular, by good solvent resistance, adhesion of foam, freedom from creep, good flow in the molten state and basic impact strength.

The Examples which follow illustrate the invention. Parts and percentages are by weight, unless stated otherwise. The products were tested by the following methods:

1. The tensile strength ($N/mm^2$) and yield strength ($N/mm^2$) were measured on a molded dumbbell-shaped bar according to DIN 53,455.

2. The content of soft component (gel content) was determined by preparing a 5.7% strength solution of the polymer in toluene, centrifuging off the insoluble gel at 30,000 g, decanting the supernatant solution and drying the residue (ie. the gel). The gel content was calculated from the equation given earlier.

3. The swelling index was calculated from the wet weight and dry weight, recorded during determination of the gel content, by using the equation given earlier.

4. The weight-average particle size of the disperse soft component phase was determined by counting and averaging the particles belonging to the same size category (constant interval size), using electron micrographs of thin layers. The cumulative mass distribution curve is determined from the volumes of the particles (3rd power of the apparent diameter), within the various intervals. The equivalent diameter can then be read off on the abscissa at the point corresponding to the 50% ordinate value. The mean diameters quoted represent a mean value of at least 5,000 particles.

5. The stress cracking resistance was measured as follows:

(a) Resistance to fat: this was tested by the method of DIN 53,444, through determining the breaking stress ($kp/cm^2$) in a 1:1 olive oil/oleic acid mixture at 23° C. According to practical requirements, the breaking stress for 100 hours exposure should not be less than 38–40 $kp/cm^2$.

(b) Resistance to low-boiling halohydrocarbons: this was determined by testing the elongation, according to DIN No. 53,455, of a molded dumbbell-shaped bar after 50 minutes' storage, in a defined prestressed form, in an atmosphere of the low-boiling halohydrocarbon, in comparison with the elongation of the untreated sample. The elongation must not drop to less than 75% of the initial value.

In the Examples which follow, products which only possess some of the properties required by the invention are compared with products according to the invention.

The products were prepared by mass/suspension polymerization (S), using a method based on U.S. Pat. No. 2,862,906. The rubber employed was in every case polybutadiene with 35% of cis-1,4, 55% of trans-1,4 and 10% of 1,2-vinyl configuration; the vinylaromatic monomer employed was styrene. All products contained 0.1% by weight of di-tert.-butyl-p-cresol as antioxidant. Mineral oil (viscous paraffin oil, DAB 7) was employed as the lubricant. Further details are to be found in the Tables which follow. The rubber content shown is based on the impact-resistant polymer, whilst the mineral oil content or butyl stearate content is based on the total molding material.

EXAMPLE 1

A mixture of 11.2 parts of a polybutadiene containing 10% of 1,2-vinyl units, 11.2 parts of ethylhexyl acrylate, 116.2 parts of styrene, 0.14 part of paraffin oil, 0.014 part of tert.-dodecylmercaptan and 0.014 part of dicumyl peroxide was prepolymerized to a solids content of 39.5% in a 5 liter reactor at a polymerization temperature of 115° C. The speed of stirring was 50 rpm. The material was then suspended in 1,800 g of an aqueous solution which contained 9 g of polyvinylpyrrolidone as a suspending agent and was polymerized, whilst stirring at 250 rpm, successively for 3 hours at 110° C., 3 hours at 120° C. and 4 hours at 140° C. The beads were washed, dried and compounded on an extruder. Gel content: 32.6%, swelling index in toluene: 9.7, intrinsic viscosity: 70.2 ml/g (measured in toluene at 23° C.), mean particle diameter: 4.8 μm.

$$S = \frac{\Delta \delta}{\delta} = 18\%.$$

The stress-cracking resistance was measured in terms of the decrease in elongation in a Frigen 11 atmosphere. The relative decrease in elongation in the present instance was 12% after 50 minutes' storage in Frigen 11, i.e. the residual elongation was 88%.

EXAMPLE 2

(Comparative Example)

Example 1 was repeated with the difference that during the prepolymerization the mixture was stirred at 200 rpm. This produced smaller rubber particles. Gel content: 30.5%; swelling index in toluene: 9.8; intrinsic viscosity: 73 ml/g; mean particle diameter: 3.0 μm.

$$S = \frac{\Delta \delta}{\delta} = 16\%.$$

The relative decrease in elongation in Frigen 11 after 50 minutes' storage was 88%, so that the residual elongation was 12%.

This Example shows clearly that the rubber particles must have a minimum size if the product is to be resistant to stress cracking.

EXAMPLE 3

Example 1 was repeated with the difference that methyl methacrylate was employed in place of ethylhexyl acrylate.

Gel content: 33.4%; swelling index in toluene: 12.9; mean particle diameter: 5.3 μm.

$$S = \frac{\Delta \delta}{\delta} = 25\%.$$

Relative decrease in elongation in Frigen 11 after 50 minutes' storage: 8%, i.e. residual elongation: 92%.

EXAMPLE 4

Instead of 11.2 parts of methyl methacrylate and 116.2 parts of styrene, as in Example 1, 64 parts of each of these monomers were employed.

Gel content: 31.8%; swelling index: 10.3; intrinsic viscosity=75 ml/g; mean particle diameter: 4.5 μm.

$$S = \frac{\Delta \delta}{\delta} = 8\%.$$

Relative decrease in elongation in Frigen 11: 10%; residual elongation: 90%.

EXAMPLE 5

Instead of the ethylhexyl acrylate in Example 1, butyl acrylate was used.

Gel content: 33.8%; swelling index in toluene: 12.4; mean particle diameter: 5.6 μm.

$$S = \frac{\Delta \delta}{\delta} = 19\%.$$

Relative decrease in elongation in Frigen 11: 13%; residual elongation: 87%.

EXAMPLE 6

A mixture of 10 parts of rubber, 10 parts of methyl methacrylate, 1.5 parts of mineral oil, 78.5 parts of styrene, 0.1% of tert.-dodecylmercaptan, 0.1% of dicumyl peroxide and antioxidant was polymerized at 110° C., whilst stirring, to a solids content of 33.0%. The final polymerization of the mixture was then carried out in suspension, in a conventional manner.

Yield strength: 17.6; tensile strength: 19.1.
Mean particle size: 3.6 μm
Swelling index: 8.5
Gel content: 34%.

The stress-cracking resistance was measured in terms of the decrease in elongation after storage in Frigen 11 under 1 bar pressure. After 50 minutes' storage, the residual elongation was 82%.

We claim:

1. A thermoplastic molding material which contains a polymer of a monovinyl-aromatic compound which is formed by polymerizing the said compound in the presence of a rubber and which has hence been made impact-resistant with said rubber, said polymer including dispersed heterogeneous soft component, the proportion of soft component dispersed in the impact-resistant polymer being between 28–50% by weight, and the tensile strength of the molding material, measured by a tensile test on a molded dumbbell-shaped bar, according to DIN No. 53,455, being not less than 5% above the corresponding yield strength, wherein the polymer is formed by copolymerizing a monovinyl-aromatic compound with from 2 to 12% by weight of an acrylic acid derivative or methacrylic acid derivative, said derivative being an ester of acrylic acid or methacrylic acid with a monoalcohol of 1 to 8 carbon atoms or a nitrogen containing derivative of acrylic acid or methacrylic acid in the presence of a rubber, and the particles of the disperse soft component phase in the impact-resistant polymer have a weight-average mean diameter of not less than 3.5 μm, the swelling index of the soft component in toluene is from 8 to 15.

2. A thermoplastic molding material as claimed in claim 1, wherein the polymer is formed by copolymerization of styrene and an ester of acrylic acid with a monoalcohol of 1 to 8 carbon atoms.

3. A thermoplastic molding material as claimed in claim 1, wherein the polymer is formed by copolymerization of styrene and an ester of methacrylic acid with a monoalcohol of 1 to 8 carbon atoms.

* * * * *

UNITED STATES PATENT AND TRADEMARK OFFICE
CERTIFICATE OF CORRECTION

PATENT NO. : 4,330,641
DATED : May 18, 1982
INVENTOR(S) : Adolf Echte, Hermann Gausepohl, Helmut Jenne, and Hans Mittnacht It is certified that error appears in the above—identified patent and that said Letters Patent is hereby corrected as shown below:

On The Title Page, ABSTRACT,

In the sixth (6) line after "The" the word 'folding' should be deleted and --molding-- should be inserted in its place.

Signed and Sealed this

Fourteenth Day of September 1982

[SEAL]

Attest:

Attesting Officer

GERALD J. MOSSINGHOFF

Commissioner of Patents and Trademarks